(12) United States Patent
Simmons et al.

(10) Patent No.: US 9,174,394 B2
(45) Date of Patent: Nov. 3, 2015

(54) PREPREGS

(75) Inventors: Martin Simmons, Baldock (GB); John Cawse, West Wratting (GB)

(73) Assignee: Hexcel Composites Limited, Cambridge (GB)

(*) Notice: Subject to any disclaimer, the term of this patent is extended or adjusted under 35 U.S.C. 154(b) by 749 days.

(21) Appl. No.: 12/922,884

(22) PCT Filed: Mar. 9, 2009

(86) PCT No.: PCT/GB2009/050230
§ 371 (c)(1),
(2), (4) Date: Sep. 16, 2010

(87) PCT Pub. No.: WO2009/115832
PCT Pub. Date: Sep. 24, 2009

(65) Prior Publication Data
US 2011/0014419 A1 Jan. 20, 2011

(30) Foreign Application Priority Data
Mar. 20, 2008 (GB) .................................. 0805203.7

(51) Int. Cl.
*B32B 3/10* (2006.01)
*B29C 70/54* (2006.01)
*B29C 70/20* (2006.01)
*C08J 5/24* (2006.01)
*B29C 70/74* (2006.01)

(52) U.S. Cl.
CPC ............. *B29C 70/543* (2013.01); *B29C 70/20* (2013.01); *C08J 5/24* (2013.01); *B29C 70/747* (2013.01); *Y10T 156/10* (2015.01); *Y10T 428/24132* (2015.01); *Y10T 428/24802* (2015.01)

(58) Field of Classification Search
CPC ...... B29C 70/20; B29C 70/50; B29C 70/747; B32B 3/00; B32B 3/02; B32B 3/10; B32B 3/30; Y10T 428/2457; Y10T 248/24132; Y10T 428/24802; C08J 5/24
USPC .................................. 428/113, 114, 156, 167
See application file for complete search history.

(56) References Cited

U.S. PATENT DOCUMENTS

| 3,096,958 | A | * | 7/1963 | Koontz ...................... 244/123.3 |
| 4,212,930 | A | | 7/1980 | Athearn |
| 4,213,930 | A | | 7/1980 | Goodrich et al. |
| 4,900,379 | A | | 2/1990 | Chapman |
| 5,022,845 | A | * | 6/1991 | Charlson et al. .............. 425/403 |
| 5,104,718 | A | | 4/1992 | Asada et al. |
| 5,236,646 | A | | 8/1993 | Cochran et al. |
| 2004/0065409 | A1 | * | 4/2004 | Lindsay et al. ................ 156/285 |

FOREIGN PATENT DOCUMENTS

| EP | 1338406 A2 | 8/2003 |
| GB | 2433466 A | 6/2007 |
| WO | 00/27632 | 5/2000 |

* cited by examiner

*Primary Examiner* — Donald J Loney
(74) *Attorney, Agent, or Firm* — W. Mark Bielawski; David J. Oldenkamp

(57) ABSTRACT

The invention provides a prepreg comprising matrix and fibers, having deposited thereon a plurality of regions raised at least 5 micrometers relative to the surface of the matrix, a method of preparing such a prepreg, a method of curing a laminate of a plurality of such preprags and the cured laminate produced by such a method.

20 Claims, 3 Drawing Sheets

PREPREGS

TECHNICAL FIELD

The present invention relates to improvements in prepregs and cured laminates of a plurality of such prepregs, particularly in reducing the porosity of such laminates.

BACKGROUND

Composite materials have well-documented advantages over traditional construction materials, particularly in providing excellent mechanical properties at very low material densities. As a result, the use of such materials is becoming increasingly widespread and their application ranges from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

One hazard associated with such a process is the entrapment of gas between the layers of prepreg which results in undesirable porosity in the cured composite laminate. Porosity has a negative impact on the mechanical properties of the cured composite laminate and is therefore ideally minimised or eliminated.

It is known that the application of pressure during the curing process can reduce the final porosity of the cured laminate. If a low porosity composite is desired, e.g. for demanding applications such as aerospace, then prolonged exposure to high temperature and pressure, e.g. by curing the laminate in an autoclave, is the only practical option. However, the application of high pressure and temperature for prolonged periods is costly and slow.

Curing methods which involve lower pressures, e.g. the known vacuum bag process, are cheaper and quicker alternatives but usually result in higher porosity in the cured laminate.

Consequently, efforts have been made to reduce porosity by adapting the structure of laminates before curing.

U.S. Pat. No. 5,104,718 discloses a laminate of prepregs wherein the prepregs have longitudinal grooves parallel to the unidirectional fibres within the prepregs.

SUMMARY OF THE INVENTION

In a first aspect, the present invention relates to a prepreg comprising resin matrix and fibres, having deposited thereon a plurality of regions raised at least 5 microns relative to the surface of the matrix.

As the raised regions are deposited onto the surface of the matrix, the structure of the prepreg before deposition is not disturbed, thus preventing damage being caused to the fibres contained within. Thus, the prepregs of the present invention comprise resin matrix at the surface, onto which the plurality of resins are deposited. A resin surface, as opposed to a fibrous surface, provides a smoother, flatter surface, enabling the raised regions, which may themselves be only very thin, to provide effective spacing between laminated prepregs.

Thus, in a second aspect, the present invention provides a method of treating a prepreg comprising matrix and fibres, the method comprising depositing a plurality of regions raised relative to the surface of the matrix.

When the prepregs according to the invention are "laid-up" into a laminate of prepregs, the raised regions provide channels for any entrapped gas to escape from the laminate during subsequent curing, resulting in lower porosity in the cured laminate.

Furthermore, the prepregs according to the invention have levels of drapability, flexibility and tack such that they can be used in the normal way and can be used to form structures conveniently and efficiently.

The resin typically comprises a thermosetting resin and may be selected from those conventionally known in the art, such as resins of phenol formaldehyde, urea-formaldehyde, 1,3,5-triazine-2,4,6-triamine (Melamine), bismaleimide, epoxy resins, vinyl ester resins, benzoxazine resins, polyesters, unsaturated polyesters, cyanate ester resins, or mixtures thereof. Epoxy resins are particularly preferred. Curing agents and optionally accelerators may be included as desired.

The fibres may take a wide variety of forms and be made from a wide range of suitable materials. The fibres may be unidirectional or woven in a multi-directional arrangement, or non-woven, as desired according to the requirements of the intended application. A preferred arrangement is to use unidirectional fibres and arrange the structural layers so that they alternate their fibre direction, to form a quasi isotropic assembly. Other ply stacking arrangements can be adopted depending on the specific application.

The fibres may be made from carbon fibre, glass fibre or organic fibres such as aramid.

In a preferred embodiment, the raised regions are deposited by printing them onto the surface of the matrix. Types of printing that are suitable in this invention are ones that involve no actual contact with the prepreg. These include inkjet printing, electrographic printing, xerographic printing and any other non contact printing techniques. Inkjet printing is particularly desirable as it does not involve any contact with the prepreg, preventing damage to its structure as well as minimising deterioration of the print head. For a small scale process, the Xenjet 4000 inkjet printer gives good results.

Several passes of a prepreg through the printer may be required in order to give sufficient height of raised region. For an industrial scale process, similar ink jet print heads to those used on a small scale may be used, ganging the print heads as required to allow the entire width of the prepreg to be printed rapidly and efficiently.

Employing a printing method to deposit the raised regions has the additional advantage of allowing practically any arrangement of raised regions to be deposited, however complicated they may be.

Preferably the raised regions are formed by deposition of a material curable by a method other than thermal, e.g. an ultra-violet (UV) curable material, so that they may be cured following deposition without curing the matrix of the prepreg. Curable materials are particularly beneficial when depositing the raised regions by printing, as they may be deposited in liquid form being subsequently cured by a method other than thermal, leaving hardened raised regions on uncured prepreg.

Typically the deposited liquid will be cured before the prepreg is passed under the printer again to deposit further curable liquid into the raised areas. This can be repeated as desired until sufficient height of raised region has been achieved. Rapid cure of the printed raised regions is important in order to maintain precise dimensions for the said regions. If cure is not rapid, the liquid curable ink can migrate laterally or down from the point of deposition resulting in poor definition of the raised area.

In a preferred embodiment therefore, the raised regions are deposited by printing, preferably inkjet printing, a liquid curable by a method other than by thermal, preferably by UV or visible light.

Preferred materials for deposition are UV curable inkjet inks where the curable material is e.g. acrylic or vinyl ether.

The raised regions may be deposited to form any pattern as desired, such as straight lines, zig-zag lines, wavy lines, circles, squares etc. However it has been found that simple straight line arrangements perform well, particularly parallel straight lines.

It is believed that a discontinuous pattern of raised regions, e.g. broken straight lines, is better at reducing porosity than a pattern which runs continuously across the prepreg.

As the present invention involves deposition onto the surface of the prepreg, it is suitable for use with uni-directional prepregs, fabric form prepregs and multiaxial prepregs. However, better performance is achieved with lines of raised regions running parallel to the direction of the fibres in a uni-directional prepreg.

In order for adequately sized channels to be formed when the prepregs of the present invention are laid-up, the height of the raised areas must be greater than 5 microns. A typical maximum height is 200 microns, and preferably is from 10 to 100 microns, more preferably from 20 to 100 microns.

The raised regions are preferably non-conducting, either because they are discontinuous or because they are made from a non-conducting material, or both.

As discussed above, the prepregs according to the invention are intended to be laid-up to form a laminate, typically in contact with a mould. Once the laminate is formed it is exposed to elevated temperature, and optionally elevated pressure, to cause the matrix to cure, producing a cured composite laminate taking the shape of the mould.

Thus, in a further aspect, the invention provides a method of curing a laminate of a plurality of prepregs according to the invention, the method comprising exposing the laminate to elevated temperature and optionally elevated pressure, to produce a cured composite laminate.

During curing, entrapped gas flows along the channels created by the layered prepregs according to the invention and exit the laminate. During the curing process, the matrix softens as the temperature rises and it begins to flow, closing the channels and resulting in a merging of the prepregs so that they are no longer individually identifiable. Further increases in temperature cause the matrix to cure which gives the produced cured composite its solid character. Hence, the raised regions are typically no longer identifiable in the cured composite.

Accordingly, in a further aspect, the present invention provides a cured laminate of a plurality of prepregs obtainable by the method of curing a laminate according to the invention.

Suitable curing methods will be known to the person skilled in the art. As discussed above, the so-called autoclave process is commonly used because it can produce lower porosity composites but at the expense and time involved in heating up the autoclave and increasing the pressures within the vessel up to a typical level of 10 bar.

An alternative method involves placing a bag over the laminate of prepregs and pulling a vacuum so that the bag is forced around the laminate at atmospheric pressure. Typically the laminate is cured in an oven but for less time and much less expense than in the autoclave process. A disadvantage of this process however is that porosities in the produced cured composite laminates tend to be higher than in autoclave.

Because the prepregs according to the present invention help any entrapped gas to flow out of the laminate during curing, improvements in both of the above curing methods may be achieved by use of the present invention. For example the known vacuum bag method can produce cured laminate with reduced porosity, extending its potential application into areas which demand lower porosity and better mechanical properties. Alternatively the very low porosities of the autoclave process can be maintained but possibly with lower pressures or cycle times, reducing the cost for a given specified porosity.

The invention will now be described, by way of example and with reference to the following figures, in which.

Hexply 8552, M56 and M72 are epoxy resin prepreg materials available from Hexcel Composites, Duxford, Cambridge, United Kingdom.

COMPARATIVE EXAMPLE 1

Unidirectional carbon fibre 8552 prepreg of areal weight 134 gm$^{-2}$ was laid up with alternate layers in the 0 and 90 degree directional (200 mm×200 mm) The number of plies used in this lay up was twelve. The assembly was then debulked at room temperature under vacuum for fifteen minutes. The prepreg was placed on a vacuum table and cured under the following conditions: —heat up to 110° C. at a ramp rate of 1° C./min and hold for one hour, then heat up to 180° C. at a ramp rate of 1° C./min and hold for two hours. The assembly was allowed to cool to room temperature and removed from the vacuum table.

Porosity of the sample was determined by cutting three samples (30 mm×30 mm) from the centre of the laminate and then polishing the edges with fine grit sandpaper. White correction fluid was painted onto one of the cut edges of the sample and allowed to dry at room temperature. The white correction fluid was removed by scraping with the back of a knife blade. The white correction fluid that remained was to be found in porous areas of the laminate. Using image analysis software the percentage porosity could be calculated from the area of white correction compared to the total area of the edge.

Figure 1:
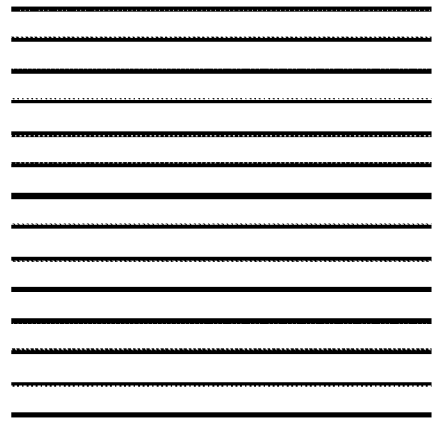
FIGS. 1 to 6 show a selection of printing patterns for the prepregs according to the invention.
Figure 2:
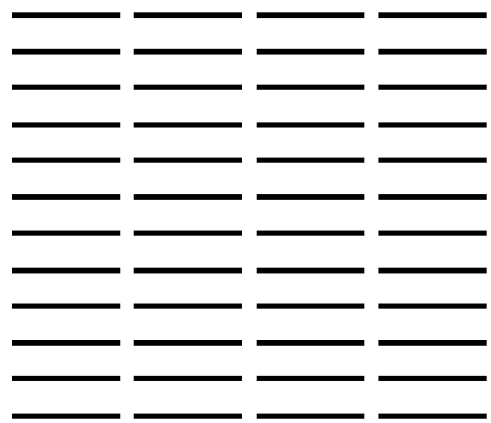
Figure 3:
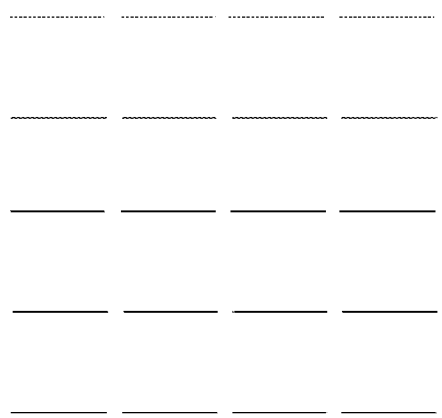
Figure 4:
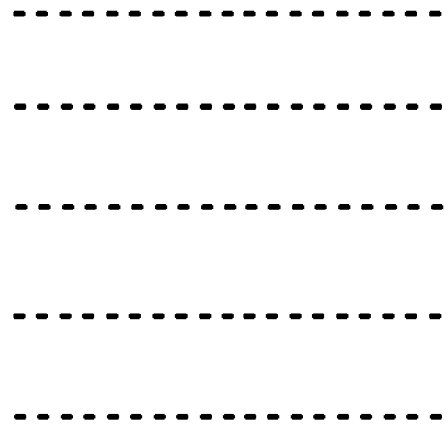
Figure 5:
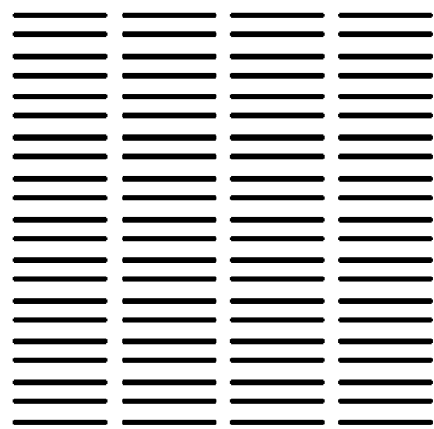
Figure 6:
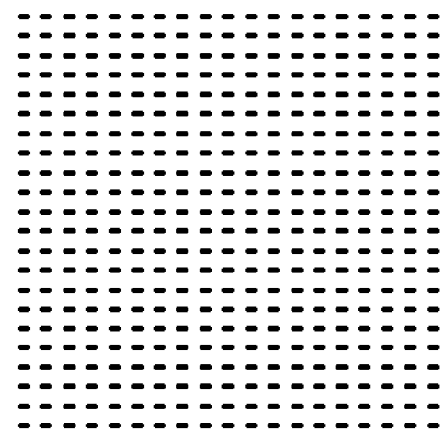
Figure 7:
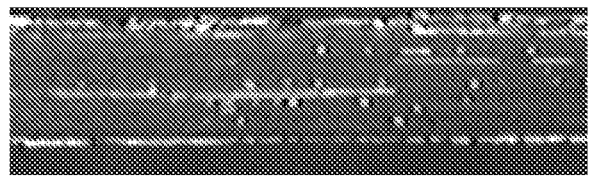
FIG. 7 is a photograph of a cross-section of a cured laminate of Hexply 8552 prepregs without modification by applying raised regions.
Figure 8:
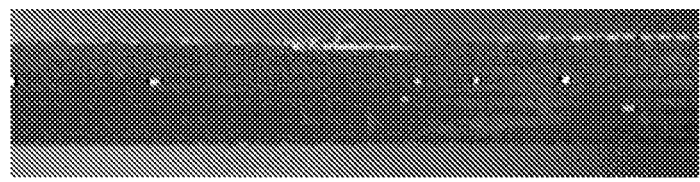
FIG. 8 is a photograph of a cross-section of a cured laminate of Hexply 8552 prepregs onto which raised regions have been applied according to the pattern shown in FIG. 3.
Figure 9:
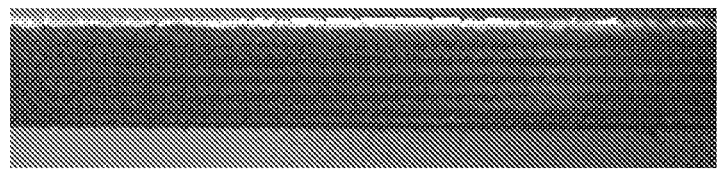
FIG. 9 is a photograph of a cross-section of a cured laminate of Hexply 8552 prepregs onto which raised regions have been applied according to the pattern shown in FIG. 4.
Figure 10:
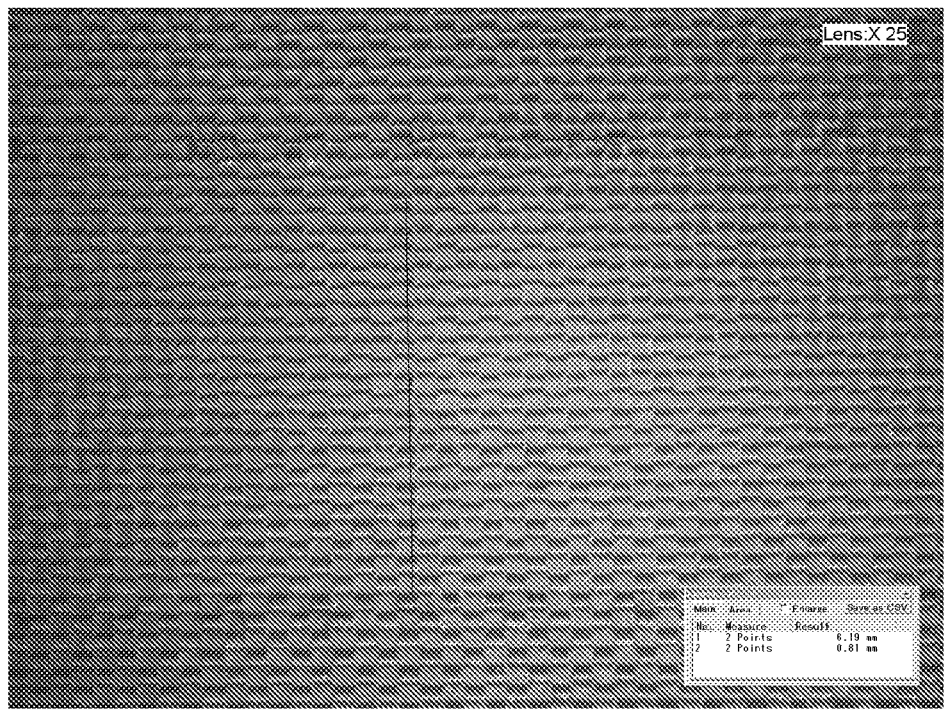
FIG. 10 is a photograph in plan of a Hexply 8552 prepreg onto which raised regions have been applied.

Average porosity was calculated by this method on three samples of laminate. Table 1 summarises porosity results of unmodified 8552 prepreg. FIGS. 7 to 9 show a cross-section of 8552 after being treated with correction fluid indicating where the porosity is which can be determined with image analysis.

EXAMPLE 2

8552 prepreg was cut to size (300 mm×300 mm) and individual plies were placed under an Omnidot 760 GS8 printhead of a Xenjet 4000. The ink to be applied was made up of a mixture of multifunctional acrylates, a proprietary photoinitiator blend and a magenta dye (Magenta Vivide X8022 Ink from Xennia). A UV lamp (fusion H bulb) was used to cure the ink at a minimum dose of 159 mJ/cm². The required pattern was then printed on the prepreg at a speed of 100 m/min Different line heights were achieved by printing more than once over the same prepreg. The printed prepreg was then laid up with alternate layers in the 0 and 90 degree direction (200 mm×200 mm) The number of plies used in this lay up was twelve. The assembly was then debulked at room temperature under vacuum for fifteen minutes.

The prepreg was placed on a vacuum table and cured under the following conditions: —heat up to 110° C. at a ramp rate of 1° C./min and hold for one hour, then heat up to 180° C. at a ramp rate of 1° C./min and hold for two hours. The assembly was allowed to cool to room temperature and removed from the vacuum table. Porosity of the sample was determined as in the previous example.

Table 1 summarises porosity results from different patterns and different line heights and compares this to unmodified prepreg.

TABLE 1

| Experiment | Print passes (thickness) | Average line height (μm) | Average porosity (%) |
|---|---|---|---|
| 8552 | — | — | 4.27 |
| 8552 | — | — | 4.89 |
| 8552 modified with design 1 | 1 | 12.1 | 1.62 |
| 8552 modified with design 1 | 2 | 26.0 | 2.45 |
| 8552 modified with design 1 | 2 | 26.0 | 1.15 |
| 8552 modified with design 2 | 2 | 26.0 | 0.87 |
| 8552 modified with design 3 | 3 | 36.1 | 1.32 |
| 8552 modified with design 4 | 1 | 12.1 | 0.64 |
| 8552 modified with design 5 | 3 | 36.1 | 0.23 |
| 8552 modified with design 6 | 3 | 36.1 | 1.10 |

EXAMPLE 3

M56 prepreg was cut to size (300 mm×300 mm) and individual plies were placed under an Omnidot 760 GS8 printhead of the Xenjet 4000. The ink and print conditions were as described in the previous Example. The number of plies used in this lay up was ten. The assembly was then debulked at room temperature under vacuum for fifteen minutes. The prepreg was then cured as in the previous Example. Porosity of the laminates was measured as described in examples 1 and 2. An average value was based on porosity measurements of three samples from the same laminate.

Table 2 summarises porosity results of M56 and a modified M56 composite.

TABLE 2

| Experiment | Print passes (thickness) | Average line height (μm) | Average porosity (%) |
|---|---|---|---|
| M56 | — | — | 0.31 |
| M56 modified with design | 2 | 26.0 | 0.04 |

EXAMPLE 4

M72 prepreg was cut and printed as described in the previous Example. The number of plies used in this lay up was ten. Debulking and cure was as previously described. Porosity of the laminates was measured as described in example 1 and 2. Average value was based on porosity measurements of three samples.

Table 3 summarises porosity results of M72 and a modified M72 composite.

TABLE 3

| Experiment | Print passes (thickness) | Average line height (μm) | Average porosity (%) |
|---|---|---|---|
| M72 | — | — | 1.50 |
| M72 modified with design | 2 | 26.0 | 0.87 |

The invention claimed is:

1. A modified prepreg wherein regions of cured ink are located on uncured thermosetting resin that forms the uncured surface of a prepreg in order to reduce the porosity of laminates made from said prepreg, said prepreg comprising:
   a prepreg comprising a layer of fibers and an uncured matrix, said uncured matrix comprising uncured thermosetting resin wherein said prepreg comprises an outer uncured fibre-free surface that is formed by said uncured thermosetting resin; and
   a plurality of hardened fibre-free raised regions of cured ink that are located on top of said outer uncured fibre-free surface, said regions of cured ink having a thickness that extends a height above said outer uncured fibre-free surface wherein the thickness of said regions of cured ink is from 10 to 100 micrometers.

2. A modified prepreg according to claim 1, wherein said regions of cured ink are formed by exposing a liquid curable ink to ultra-violet or visible light.

3. A modified prepreg according to claim 1, wherein the fibres in the prepreg are urn-directional and the regions of cured ink are in the form of segmented parallel lines that run parallel to the fibres.

4. A modified prepreg according claim 1 wherein the regions of cured ink, have a thickness of from 10 to 36 micrometers.

5. A modified prepreg according to claim 1 wherein the regions of cured ink are non-conducting.

6. A method of curing, a laminate of a plurality of modified prepregs according to claim 1, the method comprising exposing the laminate to elevated temperature to cure said uncured thermosetting resin to produce a cured composite laminate.

7. A cured laminate of a plurality of modified prepregs obtainable by the method according to claim 6.

8. A modified prepreg according to claim 1 wherein said uncured thermosetting resin is an uncured epoxy resin.

9. A modified prepreg according to claim 8 wherein said regions of cured ink are made from liquid curable ink that comprises acrylic or vinyl ether.

10. A modified prepreg according to claim 1 wherein said regions of cured ink are in the form of a pattern of parallel lines wherein each line has a thickness that extends a line height above said outer uncured fibre-free surface.

11. A modified prepreg according to claim 10 wherein said regions of cured ink are in the form of a pattern of parallel lines, said parallel lines being broken into segments to form broken parallel lines.

12. A modified prepreg according to claim 10 wherein the average line height of said regions of cured ink is 12 microns.

13. A modified prepreg according to claim 10 wherein the average line height of said regions of cured ink is 26 microns.

14. A modified prepreg according to claim 10 wherein the average line height of said regions of cured ink is 36 microns.

15. A modified prepreg according to claim 11 wherein the average line height of said regions of cured ink is 12 microns.

16. A modified prepreg according to claim 11 wherein the average line height of said regions of cured ink is 26 microns.

17. A modified prepreg according to claim 11 wherein the average line height of said regions of cured ink is 36 microns.

18. A modified prepreg according to claim 12 wherein said uncured thermosetting resin is an uncured epoxy resin and wherein said regions of cured ink are made from liquid curable ink that comprises acrylic or vinyl ether.

19. A modified prepreg according to claim 13 wherein said uncured thermosetting resin is an uncured epoxy resin and wherein said regions of cured ink are made from liquid curable-ink that comprises acrylic or vinyl ether.

20. A modified prepreg according to claim 14 wherein said uncured thermosetting resin is an uncured epoxy resin and wherein said regions of cured ink are made from liquid curable ink that comprises acrylic or vinyl ether.

\* \* \* \* \*